(12) United States Patent
Neumann et al.

(10) Patent No.: US 9,567,533 B2
(45) Date of Patent: Feb. 14, 2017

(54) PROCESS FOR SEPARATION OF WATER FROM PYROLYSIS GASOLINE

(75) Inventors: Dirk Neumann, Mannheim (DE);
Andreas Bode, Mannheim (DE);
Daniel Pfeiffer, Hassloch (DE);
Matthias Hinrichs, Lorsch (DE);
Keshav Ruthiya, Ludwigshafen (DE);
Marco Bosch, Ludwigshafen (DE);
Andrea Haunert, Grossniedesheim (DE)

(73) Assignee: BASF SE (DE)

( * ) Notice: Subject to any disclaimer, the term of this patent is extended or adjusted under 35 U.S.C. 154(b) by 533 days.

(21) Appl. No.: 13/983,319

(22) PCT Filed: Jan. 30, 2012

(86) PCT No.: PCT/IB2012/050417
§ 371 (c)(1),
(2), (4) Date: Aug. 2, 2013

(87) PCT Pub. No.: WO2012/104769
PCT Pub. Date: Aug. 9, 2012

(65) Prior Publication Data
US 2013/0310616 A1    Nov. 21, 2013

(30) Foreign Application Priority Data
Feb. 2, 2011    (EP) .................................. 11000809

(51) Int. Cl.
*C10G 33/06*    (2006.01)
*B01D 17/02*    (2006.01)
(Continued)

(52) U.S. Cl.
CPC ........... *C10G 33/06* (2013.01); *B01D 17/0208* (2013.01); *B01D 17/0211* (2013.01);
(Continued)

(58) Field of Classification Search
CPC ....................................................... C10G 33/06
(Continued)

(56) References Cited

U.S. PATENT DOCUMENTS 3,167,498 A * 1/1965 Hans-Joachim Muller ............... B01J 23/40 208/143
4,059,504 A * 11/1977 Bauer .................... B01J 23/888 208/255

(Continued)

FOREIGN PATENT DOCUMENTS

CN    101041789 A    9/2007
CN    101531948 A    9/2009
(Continued)

OTHER PUBLICATIONS

Baerns, M., et al., *Selective Hydrogenations and Dehydrogenations* (1993), Proceedings of DGMK Conference on Nov. 11-12, 1993, DGMK German Society for Petroleum and Coal Science and Technology, pp. 3-36.

(Continued)

*Primary Examiner* — Renee E Robinson
*Assistant Examiner* — Aaron Pierpont
(74) *Attorney, Agent, or Firm* — Drinker Biddle & Reath LLP

(57) ABSTRACT

A process for separating water from pyrolysis gasoline obtained from a steam cracking step uses a coalescer for the water separation. And a device comprises a coalescer for water separation from pyrolysis gasoline.

12 Claims, 2 Drawing Sheets

(51) Int. Cl.
*B01D 17/04* (2006.01)
*C10G 69/06* (2006.01)
*C10G 9/00* (2006.01)

(52) U.S. Cl.
CPC ....... *B01D 17/0217* (2013.01); *B01D 17/045* (2013.01); *C10G 9/00* (2013.01); *C10G 69/06* (2013.01); *C10G 2400/02* (2013.01)

(58) Field of Classification Search
USPC .................................................. 585/264, 812
See application file for complete search history.

(56) References Cited

U.S. PATENT DOCUMENTS

| | | | |
|---|---|---|---|
| 5,443,724 | A | 8/1995 | Williamson et al. |
| 6,037,510 | A | 3/2000 | Vicari et al. |
| 6,118,034 | A | 9/2000 | Vicari et al. |
| 6,458,920 | B1 | 10/2002 | Baxendell et al. |
| 2003/0073874 | A1 | 4/2003 | Koch et al. |
| 2007/0007171 | A1* | 1/2007 | Strack ............... C10G 9/002 208/48 Q |
| 2009/0133577 | A1* | 5/2009 | Falkiner ............ B01D 17/047 95/152 |

FOREIGN PATENT DOCUMENTS

| | | |
|---|---|---|
| DE | 19911094 A1 | 9/2000 |
| EP | 0881275 A2 | 12/1998 |
| EP | 0885273 A1 | 12/1998 |
| EP | 1302525 A2 | 4/2003 |
| JP | 08-038805 A | 2/1996 |
| JP | 200310602 | 6/2001 |
| JP | 2004-175729 A | 6/2004 |
| JP | 2005-213419 A | 8/2005 |
| JP | 2006-281123 A | 10/2006 |
| JP | 2007-326955 A | 12/2007 |
| WO | WO-2008138785 A1 | 11/2008 |

OTHER PUBLICATIONS

Hua, L.S., *Titan's Experience in Physical Separation Devices*, prepared for 15th Symposium of Chemical Engineers, Sep. 12, 2001, pp. 1-7.
Liquid/Liquid Coalescer Applications, *Ethylene Processing Dilution Steam System*, edited in 1997 by Pall Corporation.
International Search Report for PCT/IB2012/050417 mailed May 31, 2012.
English Translation of Japanese Office Action mailed on Nov. 11, 2014 for Japanese Application No. 2013-552298.

* cited by examiner

PROCESS FOR SEPARATION OF WATER FROM PYROLYSIS GASOLINE

PRIORITY

Priority is claimed as a national stage application, under 35 U.S.C. §371, to PCT/IB2012/050417, filed Jan. 30, 2012, which claims priority to European Application No. 11000809.1, filed Feb. 2, 2011. Each disclosure of the aforementioned priority applications is incorporated herein by reference in its entirety.

BACKGROUND OF THE INVENTION

The present invention relates to a process wherein water is separated from pyrolysis gasoline obtained from a steam cracking step using a coalescer for the water separation. The present invention further relates to a device comprising a coalescer for the water separation from pyrolysis gasoline.

A coalescer is a technological device performing coalescence. Coalescers are primarily used to separate two liquid phase systems like dispersions or preferably emulsions into their components via various processes. Coalescers are operated reverse to an emulsifier. Besides commonly used electronic coalescers, one main group of coalescers are mechanical coalescers. Mechanical coalescers use surfaces on which droplets coalesce. Apparatuses typically used are filter cartridges, mesh materials or vessels with different fillings. The use of mechanical coalescers is e.g. described in "Siemens Miltronics Process Instruments Inc., Case Study, 2006" and "Chem.-Ing.-Tech., 1976, No 3, pages 177 to 189".

Steam cracking is a petrochemical process in which saturated hydrocarbons are broken down into smaller, mostly unsaturated hydrocarbons. Steam cracking is the principal industrial method for producing lighter olefins like ethylene and propylene as disclosed for example in EP-A 1 302 525. Pyrolysis gasoline is a typical product which can be obtained from a steam cracking process. However, pyrolysis gasoline may also be considered as an intermediate, since it is usually subjected to further processing steps such as hydrogenation and/or separation into its components.

The article of H.-M. Allmann et al. provided at the DGMK-conference "Selective hydrogenation and dehydrogenation" on Nov. 11/12, 1993, Kassel/Germany (total of 29 pages) provides an overview on selective hydrogenations and purifications in the steam cracker downstream treatment. However, said article is silent on the presence of water during the steam cracking process or the following purification and hydrogenation steps.

In case of (free) water is present in the organic pyrolysis gasoline stream the hydrogenation catalyst may be partially or completely deactivated. Generally, the activity and life time of a fixed bed catalyst for pyrolysis gasoline hydrogenation depends on the amount of water contacting the catalyst surface. Thus, the presence of water in the pyrolysis gasoline stream has the consequence that the turnover number connected with the activity of the hydrogenation catalyst drops down and the hydrogenation catalyst needs to be regenerated more often. This means an economical and environmental disadvantage. Besides, this small water amount cannot be separated by usual methods—like phase separation by gravity—since this water amount is dispensed into small water drops in the pyrolysis gasoline stream. Also methods like e.g. distillations are ineffective for reducing the amount of water in pyrolysis gasoline obtained from a steam cracking step.

The article of Lee Siang Hua ("Titan's Experience in Physical Separation Devices"; prepared for the 15$^{th}$ Symposium of Chemical Engineers, Hyatt Hotel, Johor Bahru, Malaysia, Sep. 12, 2001; total of 7 pages) provides an overview on separation devices to be employed for removing, for example, water from organic compound streams obtained from a steam cracking process. Four different types of physical separation devices are discussed. In order to perform liquid-liquid separations, the operation may either be based on gravity separation or on coalescing separation in the oil-water coalescer to separate dissolved hydrocarbon in quench water or to remove water from raw pyrolysis gasoline. The coalescing separation may be employed, where small particles of one liquid phase must be separated or removed from a large quantity of another liquid phase. The disclosed coalescers are wire mesh coalescers contained in a horizontal vessel.

The article of Pall Corporation ("Liquid/Liquid coalescer applications: Ethylene processing-dilution steam system"; edited in 1997 by Pall Corporation; total of 2 pages) discloses a process for obtaining ethylene from pyrolysis gasoline. A total of four coalescers are employed at different positions and for different purposes within said ethylene process. One coalescer is, for example, employed to remove gasoline from water out of a first stream obtained from an oil/water separator. Another coalescer is employed to remove water from gasoline out of a second stream obtained from said oil/water separator. However, said article of Pall Corporation is silent on the material of said coalescers.

It is an object of the present invention to provide a method for the efficient separation of water from pyrolysis gasoline obtained from a steam cracking step, especially for removing the remaining water left over after a conventional phase separation step.

The problem of the present invention is solved by providing a process for reducing the water content in pyrolysis gasoline obtained from a steam cracking step, characterized in that water is separated from pyrolysis gasoline via at least one coalescer, which is made of metal, fibre glass or as a combination of metal and fibre glass.

The advantage in using a coalescer made of metal and/or fibre glass for the water separation from pyrolysis gasoline obtained from a steam cracking step is that water can be removed very efficiently. The total water content within a pyrolysis gasoline stream is the sum of the dissolved water and the entrained water. Only the entrained water can be removed from the pyrolysis gasoline by coalescence. This advantage is more significant when employing the coalescer after a conventional phase separation step for removing the main amount of water.

Furthermore, when the coalescer is used before the hydrogenation step, this hydrogenation step has a higher conversion. Therefore, the hydrogenation catalyst has a longer lifetime, since it needs to be regenerated less often. In addition, the chemical structure of the catalyst is changed by entrained water, which is avoided by water separation before hydrogenation.

It is often the case that additional streams like purchased partially hydrogenated pyrolysis gasoline or streams from reformers are mixed into the pyrolysis gasoline before the second hydrogenation step. In these cases, water separation before the hydrogenation step provides advantages to protect the catalysts similar to a separation before first hydrogenation step.

DETAILED DESCRIPTION

Figure 1:
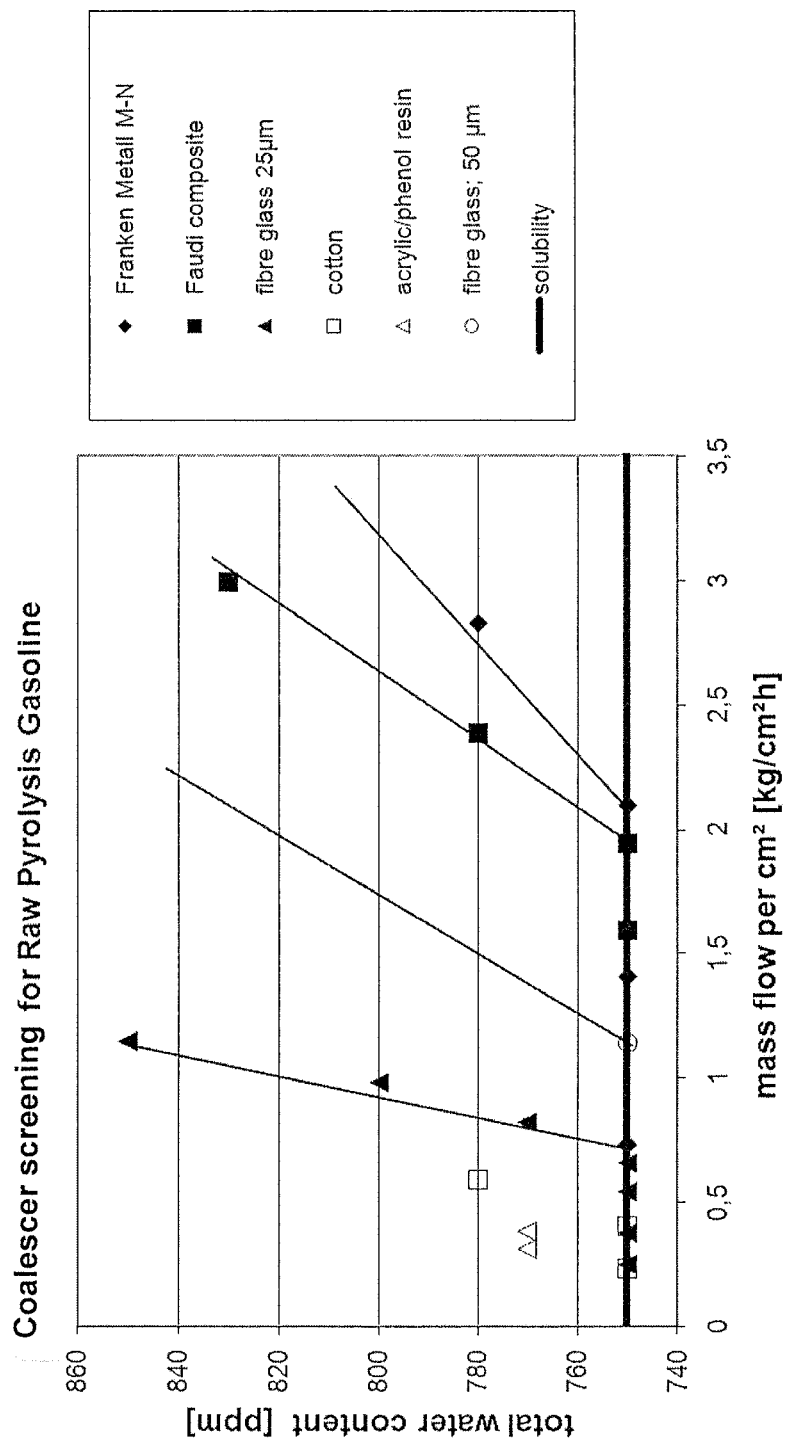
FIG. 1 shows the total water content depending on mass flow mass flow through the cartridge.

In the following, the process according to the present invention is explained in more detail.

The term "coalescer" within the context of this invention means any apparatus or device, which can be used to perform coalescence such as a coalescing step or a coalescing separation. The coalescer may be integrated or being part of a larger unit such as a housing or a vessel. Said larger unit may contain—besides the coalescer—further devices such as prefilters, pipes, inlets, outlets or seperators. Such further devices are usually connected with each other and with the coalescer by, for example, said pipes. However, said further devices are not considered as being a part of the coalescer within the context of this invention.

The coalescer employed to separate water from pyrolysis gasoline in order to reduce the water content can be any type of coalescer known to a person skilled in the art. Preferably, the coalescer is a coalescence filter cartridge, a coalescence filter or a coalescence tube.

The coalescer is made of metal, fibre glass or as a combination of metal and fibre glass. Preferably, the coalescer is made of metal or as a combination of metal and fibre glass. More preferably, the coalescer is made of metal. Coalescers made as a combination of metal and fibre glass are also designated as composite or composite candles. In case the coalescer is made of fibre glass, it is preferred to employ fibre glass with a pore diameter (fineness) of ≥40 µm. In case the coalescer is made of metal, said metal is preferably stainless steel.

The term "made" within the context of this invention means that the material employed for producing the coalescer contains metal or fibre glass, respectively. However, the material employed may contain other components than metal or fibre glass. Preferably, the material employed contains metal or fibre glass, respectively, to at least 50 weight percent, more preferably to at least 75 wt.-%. Coalescers made as a combination of metal and fibre glass means that some parts of the respective coalescers are made of metal, whereas other parts are made of fibre glass. However, the material employed may contain other components than metal and fibre glass. For the sake of clarity it is indicated that said materials can be employed for producing any type of coalescers as defined above, such as coalescence filters or coalescence tubes.

Within the process of the present invention, one or more coalescers made of metal, fibre glass or a combination thereof are employed. However, further coalescers made of a different material than metal or fibre glass may additionally be employed within the process of the present invention. Said further coalescers are, for example, made of cotton, acrylic/phenol resin or wire mesh. In the following, coalscers made of any material, especially a material different than metal or fibre glass, are specially indicated.

The steam cracking process or steam cracking step for obtaining pyrolysis gasoline is known to a person skilled in the art. The pyrolysis gasoline employed in the process according to the present invention is also known to a person skilled in the art. Suitable examples of pyrolysis gasoline to be employed in the method of the present invention can be found, for example, in the before mentioned article of H.-M. Allmann et al. at the DGMK-conference 1993. The pyrolysis gasoline preferably contains hydrocarbons with at least five carbon atoms ("$C_5^+$-cut"). A preferred pyrolysis gasoline comprises 29 to 36 weight percent of benzene, 14 to 19 weight percent of toluene, 3 to 7 weight percent of xylene, up to 1.5 weight percent of butadiene and further components. Examples of further components are ethylbenzene, styrene, 1,2,3,4-tetrahydronaphthene, indene, vinyltoluene, n-hexane, 2-methyl-1,3-butadien, isopentane, pentane, and/or naphthene.

The pyrolysis gasoline obtained from a steam cracking process may contain water in an amount up to about 1.2 kg water/kg pyrolysis gasoline. Said pyrolysis gasoline mixture (with water) is preferably obtained from a quenching step, which may be a dispersion of pyrolysis gasoline in water or vice versa.

In case the pyrolysis gasoline contains larger amounts of water, for example more than 3 weight percent of water (relative to the amount of hydrocarbons), it is preferred to carry out one or more additional water separation steps prior to the water separation by employing the coalescer.

In a preferred embodiment, the coalescer is used (employed) after a phase separation step wherein the water main phase is separated from the pyrolysis gasoline (also named as main phase separation step).

The use of the coalescer right after the phase separation step is advantageous regarding economical and environmental criteria. At that stage, the pyrolysis gasoline stream is usually pure and not diluted with further streams from pyrolysis gasoline stripping and from debutanizing, which streams may optionally be added right before a hydrogenation step, preferably before the first hydrogenation step as described below.

The phase separation step is usually carried out in a (conventional) phase separating unit by gravity separation. Such phase separating units—depending on the scale of the process—are known to the person skilled in the art. A preferred phase separating unit is selected from the group comprising settlers, vessels or columns with fillings or packings, meshes, centrifuges, separators or membranes.

After the phase separation step, the pyrolysis gasoline phase still contains a minor amount of water. The pyrolysis gasoline phase may contain up to 3 weight percent of water after the phase separation step, preferably 0.3 to 2.5 weight percent of water after the phase separation step.

In a preferred embodiment of the present invention, the coalescer is used (employed) before a hydrogenation step which is preferably a first hydrogenation step. Even more preferably, the coalescer is used after the phase separation step and before the hydrogenation step, in particular before the first hydrogenation step. If the coalescer is used before the first hydrogenation step, further coalescers may be employed after the first hydrogenation step, for example before a second hydrogenation step.

The advantage in using the coalescer before the first hydrogenation step—instead of using said coalescer after the first hydrogenation step and before the second hydrogenation step with no coalescer before the first hydrogenation step—is that an early catalyst dying of the first-hydrogenation catalyst can be prevented.

The coalescer may additionally contain a filling material. The filling material can independently be metal, fibre glass, plastic or ceramic or any other material known to a skilled person. Preferably, the filling material is made of the same material as the coalescer. Preferred materials are, therefore, metal, fibre glass or a combination thereof, in particular metal. If more than one coalescer ist employed, the filling material for each coalescer employed can be chosen independently. Preferably, each coalescer employed contains metal as filling material.

In a preferred embodiment of the present invention, the water separation in the coalescer is performed at a temperature ≤40° C. of the pyrolysis gasoline. Preferably, this embodiment is carried out in a coalescer located before the first hydrogenation step. More preferred, the temperature range is 20 to 40° C. A temperature of ≤40° C. can be obtained by cooling down the pyrolysis gasoline before entering said coalescer. Preferably, the pyrolysis gasoline is cooled down from a temperature above 80° C. to a temperature ≤40° C. If more than one coalescer is employed, it is preferred to have said conditions in each coalescer employed.

In one embodiment of the present invention a pre-filter may be employed prior to at least one coalescer, preferably prior to the coalescer which is used before the first hydrogenation step. A pre-filter is known to a person skilled in the art. For example, solid pre-filters may be employed.

Another preferred embodiment of the present invention is a steam cracking process, wherein water is separated from pyrolysis gasoline, comprising the steps
(a) quenching of a pyrolysis gasoline mixture;
(b) phase separation with separation of the water main phase from the pyrolysis gasoline;
(c) leading the pyrolysis gasoline containing up to 3 weight percent of water, through the coalescer;
(d) applying pyrolysis gasoline without entrained water to a hydrogenation step.

The conditions for carrying out the hydrogenation steps according to the method of the present invention and the catalysts employed are known to a person skilled in the art. For example, in EP-A 0 885 273, EP-A 0 881 275, EP-A 1 302 525 and DE-A 199 11 094 processes for the selective hydrogenation of unsaturated hydrocarbons are described. Catalysts for selective hydrogenation of pyrolysis gasoline are e.g. described in WO-A 2008/138785. Special devices (such as hydrogenation units) for the selective hydrogenation of pyrolysis gasoline are e.g. described in DE-A 19911094.

In one embodiment of the present invention, the process is carried out with two hydrogenation steps wherein the pyrolysis gasoline is hydrogenated. For the first liquid phase hydrogenation step mostly a fixed bed palladium or nickel on alumina catalyst are used. Before the first liquid hydrogenation step, this pyrolysis gasoline stream may optionally be mixed with further streams from pyrolysis gasoline stripping and/or from debutanizing.

In the first stage hydrogenation, mainly the dienes and styrenes are hydrogenated. The product of this hydrogenation stage is called partially hydrogenated pyrolysis gasoline. In the second hydrogenation step, most of the remaining double bonds are hydrogenated and hydrodesulfurization is carried out. The second stage hydrogenation is usually carried out in gas phase over cobalt/molybdenum or nickel/molybdenum on alumina catalysts. Also, liquid phase hydrogenation is possible.

As indicated above, more than one coalescer and/or coalescers made of different materials than metal or fibre glass may be employed in the process according to the present invention. If two or more coalescers are employed, it is preferred to employ one coalescer before the first hydrogenation step and one coalescer before the second hydrogenation step. Preferably both coalescers are made of metal, fibre glass or a combination thereof.

In a preferred embodiment of the present invention, two coalescers (A) and (B) are employed within the inventive process. The coalescer (A) is made of metal, fibre glass or a combination thereof as defined above. In contrast to coaleser (A), the coalescer (B) can be any coalescer known to a person skilled in the art. Preferably, the coalescer (B) is a coalescence filter cartridge, a coalescence filter or a coalescence tube.

The coalescer (B) may be made of any materials or mixtures of materials known to a person skilled in the art. Preferably, the coalescer (B) is made of metal, composite, fibre glass, wire mesh, cotton or acrylic/phenol resin. The more preferred material for coalescer (B) is metal. The term "made" in connection with coalescer (B) has the same meaning as defined above in connection with coalescer (A). It is preferred that the respective material is employed in an amount of at least 50 weight percent for each case.

Within said embodiment the coalescer (A) is used after the main phase separation phase and before the first hydrogenation step, whereas coalescer (B) is used after the first hydrogenation step and before the second hydrogenation step. It is even more preferred that coalescer (A) is made of metal, fibre glass or a combination thereof and coalescer (B) ist made of metal. It is most preferred that both coalescers (A) and (B) are made of metal. It is also preferred that both coalescers (A) and (B) contain filling material, which is preferably made of the same material as the respective coalescer.

In another preferred embodiment, the coalescer (B) is used after the main phase separation phase and before the first hydrogenation step, whereas coalescer (A) is used after the first hydrogenation step and before the second hydrogenation step. Within this preferred embodiment, coalescer (A) is preferably made of metal. It is also preferred that both coalescers (A) and (B) contain filling material, which is preferably made of the same material as the respective coalescer.

One or more additional streams may be added to the pyrolysis gasoline stream according to the present invention. Said additional streams may be independent from each other, for example, partially hydrogenated pyrolysis gasoline or a stream obtained from a reformer. Said additional streams are preferably added in case two coalescers are employed within the process of the present invention.

More preferably, one or more, in particular one, additional stream is added after the first hydrogenation step and before the coalescer, which in turn is used before the second hydrogenation step.

Another subject of the present invention is a device comprising at least one coalescer which is made of metal, fibre glass or a combination of metal and fibre glass, a water separation unit and at least one hydrogenation unit. Said device can be used for carrying out the process of the present invention as described above.

A water separation unit for phase separation can be any separation unit known to a person skilled in the art. Examples for separation units are settlers, vessels or columns with fillings or packings, meshes, centrifuges, separators or membranes.

Hydrogenation units are known to a person skilled in the art. Usually, hydrogenation units are pressure resistant reactors, depending on the scale of the reaction and the pressure needed.

One embodiment of the present invention is a device wherein the water separation unit is connected to the coalescer (A) and the coalescer (A) is connected to a first hydrogenation unit, which in turn is connected with the coalescer (B) followed by a second hydrogenation unit, wherein the coalescer (A) and/or the coalescer (B) is made of metal, fibre glass or a combination of metal and fibre glass.

Another subject of the present invention is the use of the above described device for the water separation of pyrolysis gasoline. Preferred is the use of a device, wherein the coalescer is made of metal.

Examples

Coalescer Screening

The phase separation of the system is strongly determined by coalescence. In order to determine the best suitable coalescer material, a coalescer screening is performed with a steam cracker product at 40° C. and 0.4 weight percent aqueous phase. During the screening of possible coalescence cartridge materials, the maximum load [kg/cm² h] through the coalescer cartridge without entrained water is also measured for each material.

In a coalescer screening a laboratory scale agitated vessel is used to produce a 0.4 wt.-% water in pyrolysis gasoline dispersion. This dispersion is pumped through a small piece of a filter cartridge beginning with small loadings. The flow direction is from inside the filter cartridge to the outside through the cartridge meshes. The filter cartridge is fixed in a small glass vessel at the inlet tube. By raising the loading through the cartridge at one characteristic point, the pyrolysis gasoline changes from clear to turbid. At this point the water content of the outled pyrolysis gasoline is higher than the solubility of 750 ppm (at 40° C.). During experiments (during raising loadings) the turbidity is observed and the water content of samples is estimated by Karl-Fischer-Titration.

Figure 2:
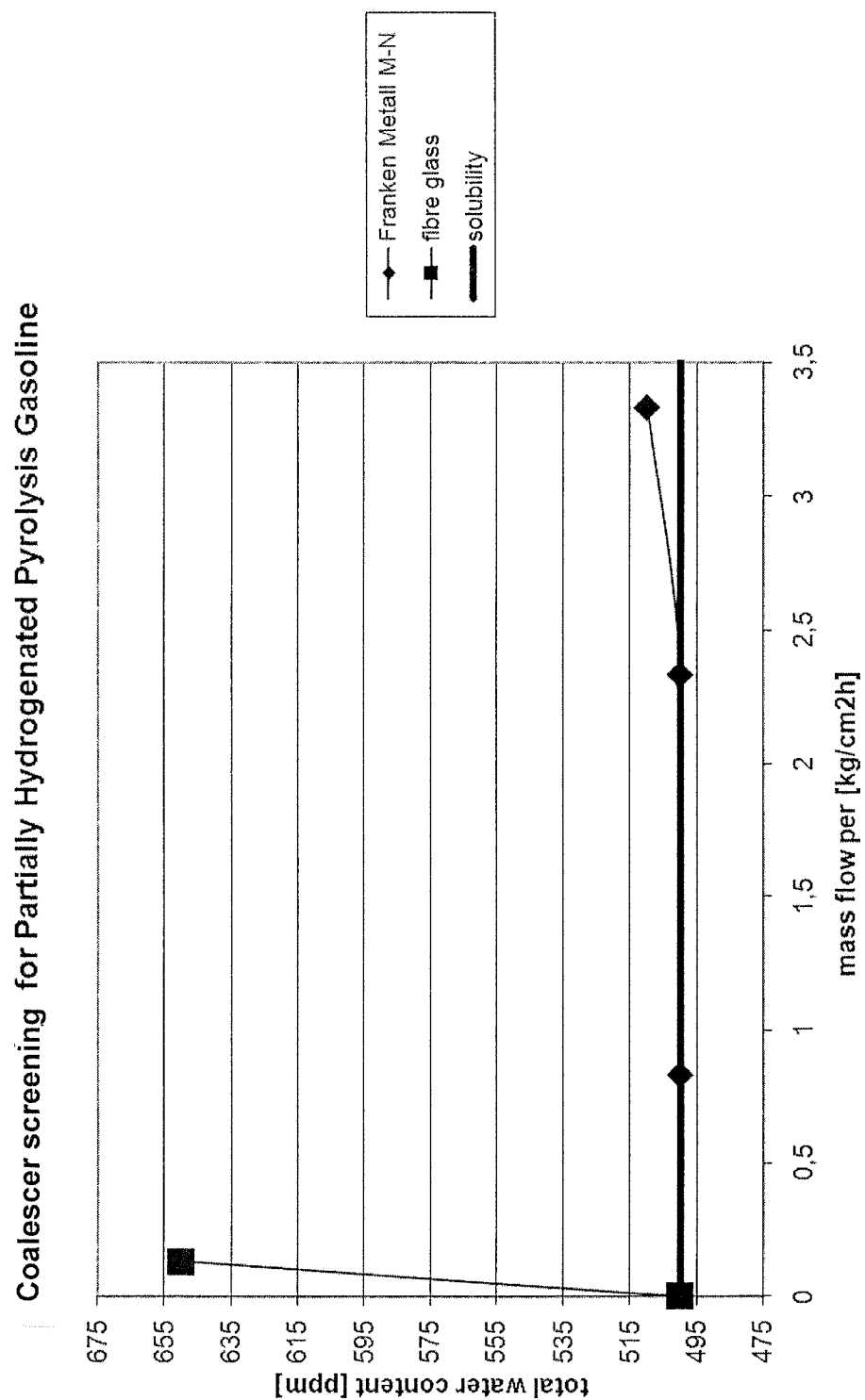
FIG. 2 shows the total water content depending on the mass flow through the cartridge before a second hydrogenation step, where a first hydrogenation step has already been performed.

The following coalescence cartridge materials according to table 1 are tested and the respective result can be seen in FIG. 1 or FIG. 2, respectively:

TABLE 1

| Material | Manufacturer |
| --- | --- |
| metal | Franken |
| Combination of metal and fibre glass (composite) | Faudi (Type P) |
| fibre glass | Fuhr |
| cotton | AMA |
| acrylic/phenol resin | Cuno |

For fibre glass two mesh sizes 25 µm and 50 µm are tested.

FIG. 1 shows the total water content depending on the mass flow through the cartridge. The 750 ppm line corresponds to the solubility of water in pyrolysis gasoline at 40° C. and is therefore the baseline ("dissolved water"). With raising loads for each material the water concentration raises at one point too. With this characteristic point the materials can be ranked. The higher the value of the maximum mass flow the better the material.

The total water content is the sum of the dissolved water and the entrained water. Only the entrained water can be removed from the pyrolysis gasoline by coalescence.

The metal and the composite candles show the best coalescence performance at high loadings. Fibre glass shows medium performance for 50 µm fineness and lower performance for 25 µm fineness. Cotton shows low performance, whereas the acrylic/phenol resin shows worst performance. The measurement according to FIG. 1 is performed before a (first) hydrogenation step.

FIG. 2 shows the total water content depending on the mass flow through the cartridge before a second hydrogenation step, a first hydrogenation step has already been performed prior to this measurement. Metal still shows the best coalescence performance, whereas the performance of fibre glass decreases compared to the performance before the first hydrogenation step.

The invention claimed is:

1. A process for reducing the water content in a pyrolysis gasoline obtained from a steam cracking step comprising (i) a phase separation step, (ii) a coalescence step, and (iii) a hydrogenation step, wherein water is separated from the pyrolysis gasoline via at least one coalescer, which is made of metal, fibre glass or a combination of metal and fibre glass, wherein said at least one coalescer is used before the hydrogenation step, and wherein said at least one coalescer is used after the phase separation step, wherein the phase separation step comprises separating a water main phase from a pyrolysis gasoline mixture obtained from a steam cracking step to obtain said pyrolysis gasoline, wherein said pyrolysis gasoline contains from 0.3 to 2.5 weight percent of water.

2. The process according to claim 1, wherein said hydrogenation step is a first hydrogenation step, and further comprising a second hydrogenation step.

3. The process according to claim 1, wherein the phase separation step is carried out in a phase separation unit selected from the group consisting of settlers, vessels or columns with fillings or packings, meshes, centrifuges, separators or membranes.

4. The process according to claim 1, wherein said at least one coalescer is a coalescence filter cartridge, a coalescence filter or a coalescence tube.

5. The process according to claim 1, wherein said at least one coalescer additionally contains filling material.

6. The process according to claim 5, wherein the filling material is made of the same material as the at least one coalescer.

7. The process according to claim 1, wherein the water separation in said at least one coalescer is performed at a temperature ≤40° C. of the pyrolysis gasoline.

8. The process according to claim 1, further comprising the steps of:
   (a) quenching the pyrolysis gasoline mixture prior to said phase separation step;
   (b) leading the pyrolysis gasoline containing from 0.3 to 2.5 weight percent water through the coalescer to produce a pyrolysis gasoline without entrained water; and
   (c) passing the pyrolysis gasoline without entrained water to the hydrogenation step.

9. The process according to claim 2, wherein said at least one coaleser is a coalescer (A), used before the first and second hydrogenation steps and wherein the process optionally comprises a coalescer (B), which is used after the first hydrogenation step and before the second hydrogenation step.

10. The process according to claim 9, wherein the coalescer (A) is made of metal or the coalescer (B) is made of metal.

11. The process according to claim 2, wherein said at least one coaleser is a coalescer (A), wherein the coalescer (A) is used before the first and second hydrogenation steps and the process farther comprises a coalescer (B), wherein the coalescer (B) is used before the first hydrogenation step.

12. The process according to claim 2, wherein the second hydrogenation step is carried out in the gas phase over a catalyst, wherein the catalyst comprises (i) cobalt/molybdenum on alumina or (ii) nickel/molybdenum on alumina.

* * * * *